June 11, 1963  R. W. GARRISON  3,093,111
POULTRY WATERING FOUNTAIN
Filed Sept. 5, 1961  2 Sheets-Sheet 1
Fig. 1
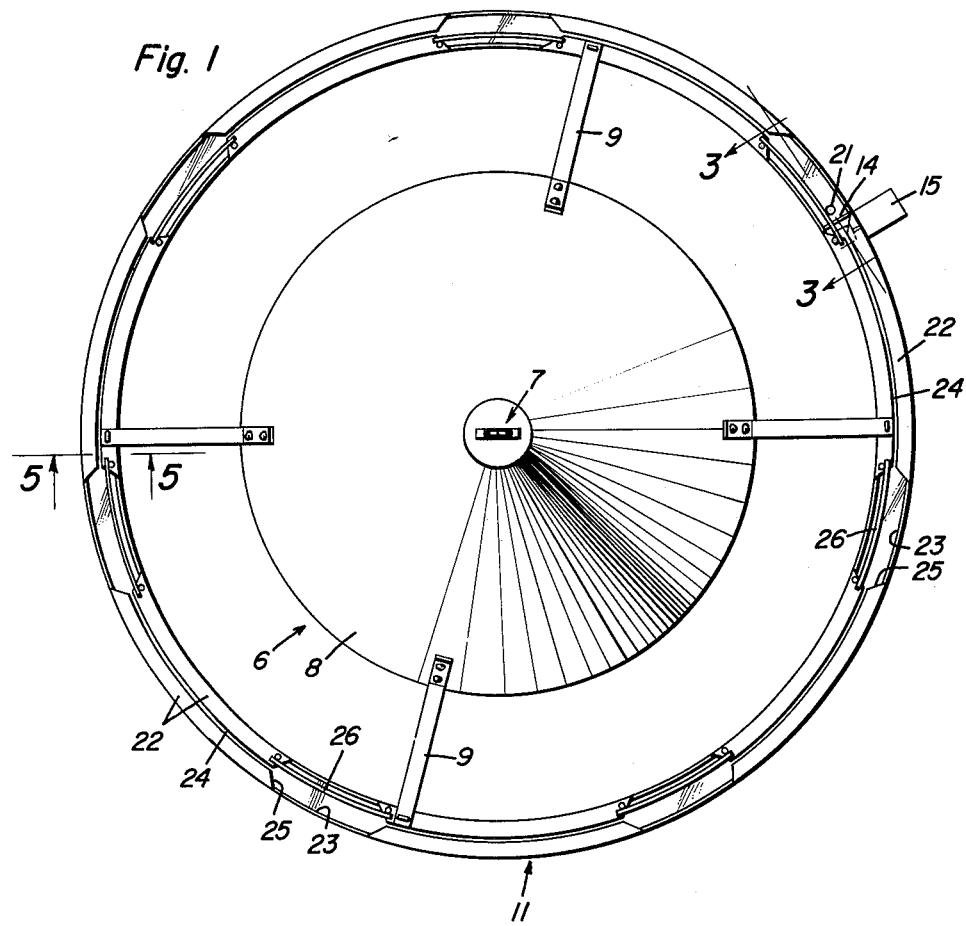
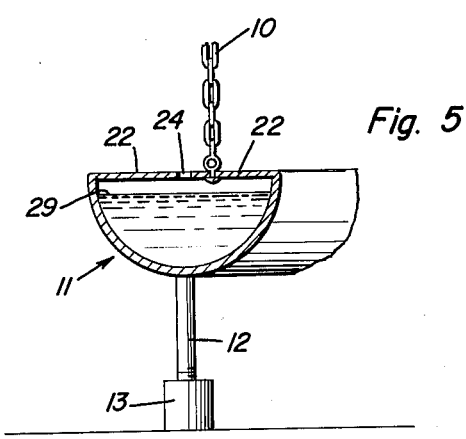
Fig. 5
Randall W. Garrison
INVENTOR.
BY *Clarence A. O'Brien*
*and Harvey B. Jacobson*
Attorneys

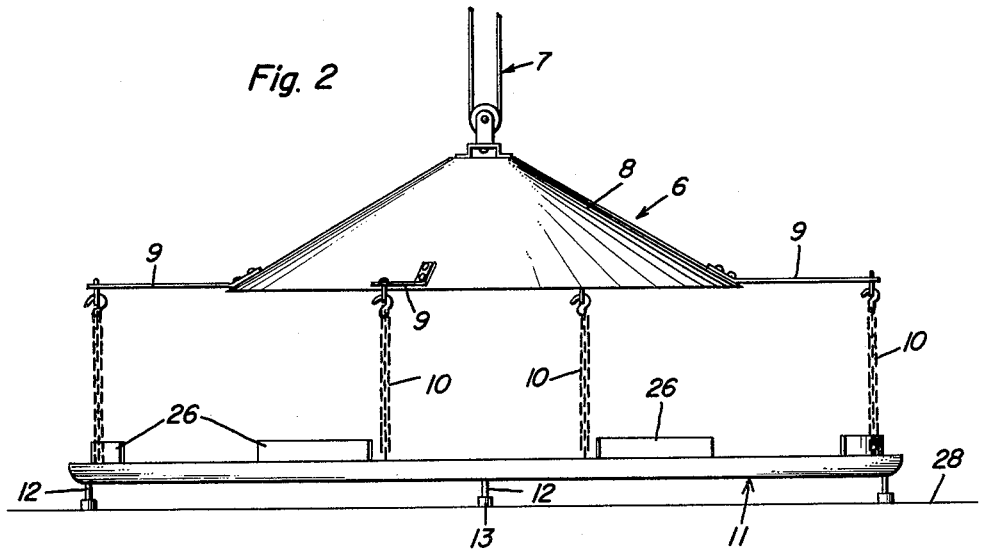
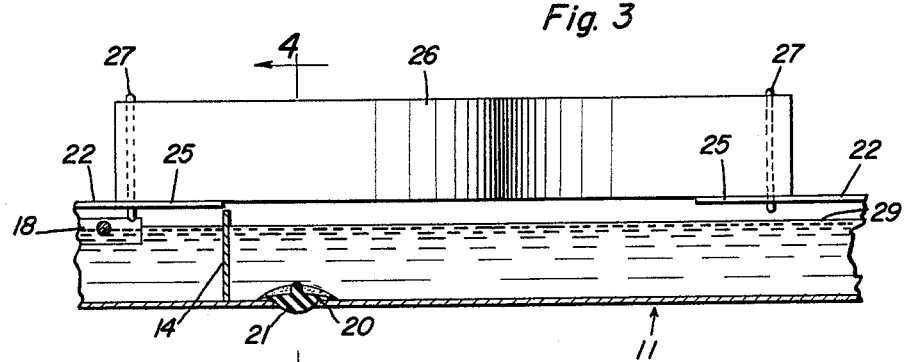
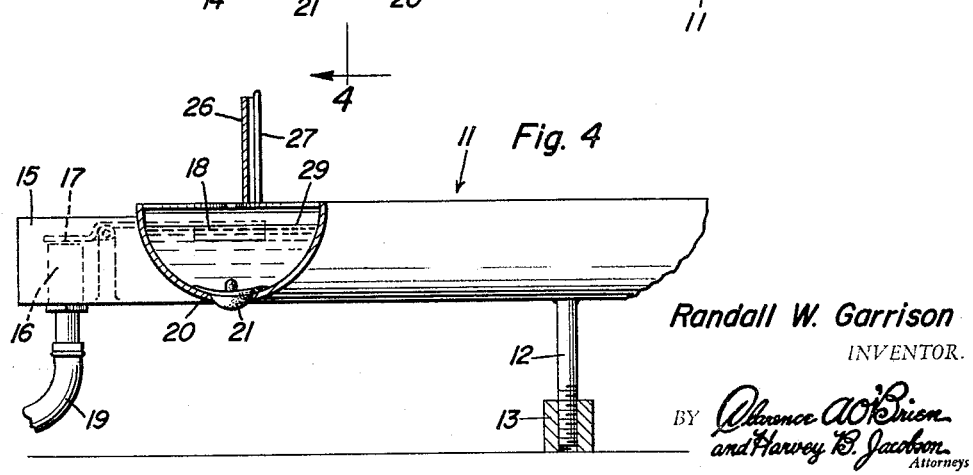
Randall W. Garrison
INVENTOR.

United States Patent Office 3,093,111
Patented June 11, 1963

3,093,111
POULTRY WATERING FOUNTAIN
Randall W. Garrison, R.R. 4, Fayetteville, Ark.
Filed Sept. 5, 1961, Ser. No. 135,979
7 Claims. (Cl. 119—72)

This invention relates to new and useful improvements in automatic poultry drinking fountains particularly, although not necessarily, for chicks or turkeys of brooder age, and has for its primary object to provide, in a manner as hereinafter set forth, a device of this character which is adapted to be used in conjunction with a conventional brooder stove for warming the water and maintaining same at a steady, uniform temperature.

Another very important object of the present invention is to provide an improved poultry water fountain of the aforementioned character which may be expeditiously and thoroughly cleaned, disinfected and maintained in a highly sanitary condition at all times.

Still another important object of the invention is to provide an automatic, heated drinking fountain of the character described wherein the poultry will be prevented from contaminating the water.

Another object of this invention is to provide a poultry fountain of the character described which, when it is not being used as, for example, when the chicks are old enough to drink from a larger, conventional fountain, may be elevated and stored in unison with the brooder stove in an out-of-the-way position near the ceiling of the building.

Other objects of the invention are to provide an improved poultry fountain which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view, showing a poultry fountain embodying the present invention suspended on a brooder stove;

FIGURE 2 is a view in side elevation thereof;

FIGURE 3 is a fragmentary view in vertical section and on an enlarged scale through a portion of the device, taken substantially on the line 3—3 of FIGURE 1;

FIGURE 4 is a cross-sectional view taken substantially on the line 4—4 of FIGURE 3; and FIGURE 5 is a cross-sectional view on an enlarged scale, taken substantially on the line 5—5 of FIGURE 1.

Referring now to the drawing in detail, it will be seen that reference numeral 6 designates a conventional conical brooder stove which may be of any desired size or dimensions. As usual, the stove 6 is suspended for vertical movement from the ceiling of the poultry building by means comprising a block and fall 7. Secured on the marginal portion of the hood 8 of the stove 6 and projecting horizontally from the periphery thereof is a plurality of arms 9. Adjustably suspended by chains 10 from the arms 9 is an annular water trough 11 of substantially semi-circular cross-section. The trough 11, when in use, rests on adjustable leveling legs 12. In the embodiment which has been illustrated, the legs 12 include threadedly adjustable sleeves or lower sections 13.

The trough 11 has mounted therein a partition or baffle 14. Mounted on the trough 11 and communicating therewith on one side of the partition 14 is a float valve chamber 15. Mounted in the chamber 15 is a water inlet 16 which is controlled by a pivoted valve 17, said valve being actuated by a float 18. A hose 19 from a suitable source of water supply is detachably connected to the inlet 16. The trough 11 is provided, adjacent the other side of the partition 14, with a drain opening 20 which is closed by a suitable plug 21.

At spaced points the trough 11 is substantially covered by inturned flanges 22 defining open drinking areas 23. The pairs of inturned flanges 22 are spaced from each other in a manner to provide circumferentially extending slots 24 which communicate with the drinking areas 23. The ends of the pairs of flanges 22 are convergent and define V-shaped guides 25 the purpose of which will be presently set forth. Extending between the adjacent end portions of the inner flanges 22 are guards 26 which circumferentially traverse the open drinking areas of the trough 11. The upstanding, longitudinally curved guards 26 are optional and, in the embodiment shown, comprise end posts or pins 27 (see FIGURE 3) which are engaged in openings provided therefor in the inner flanges 22.

It is thought that the use or operation of the fountain will be readily apparent from a consideration of the foregoing. Briefly, the legs 12 normally support the trough 11 on a suitable supporting surface, as indicated at 28. The adjustable legs 12 permit the trough 11 to be leveled on the supporting surface 28. The level of the water, as indicated at 29, in the trough 11 is automatically controlled by the float actuated valve 17. The water 29 in the trough 11 is warmed and maintained at a uniform temperature by the brooder stove 6 in an obvious manner. Chicks approaching or leaving the brooder stove 6 cross the portions of the trough 11 which are protected by the inturned flanges 22, being prevented or discouraged from crossing the open drinking areas of said trough by the guards 26. To clean and disinfect the trough, the brooder stove 6 is raised through the medium of the block and fall 7, thus elevating said trough. A bucket is placed under the drain opening 20 and the trough is then lowered thereon. The water supply is then cut off and the plug 21 is removed for permitting the trough to drain into the bucket. A suitable brush comprising a handle is then inserted in the trough 11 on the side of the partition 14 which includes the water inlet. The brush is then worked circumferentially around the trough to the drain opening 20, the brush handle passing through the slots 24 into which it is guided at 25. Thus, the trough 11 is expeditiously and thoroughly cleaned, after which the bucket is removed, the plug 21 is replaced and the water again turned on. Of course, during the cleaning operation the water may be turned on, if desired, to flush the trough. The adjustability of the suspension chains 10 allows the vertical distance between the brooder stove 6 and the trough 11 to be varied as desired. Thus, the trough 11 may be positioned closely adjacent the brooder stove 6 when the assembly is to be hoisted and stored beneath the roof or ceiling of the building. By raising or lowering the stove 6 relatively to the trough 11 the heat transmitted to the water in said trough may be regulated as desired. When the apparatus is in use the adjustable chains 10 also stabilize the stove 6 over the trough 11. As shown to advantage in FIGURE 1 of the drawing, the trough 11 is larger in diameter than the stove 6. It is to be noted that the slots 24 are sufficiently narrow to prevent the legs of the chicks from being caught therein. Of course, the fountain may be of metal, molded plastic or other suitable material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. For example, a readily removable cover (not shown) may, if desired, be provided for the trough 11.

What is claimed as new is as follows:

1. A poultry drinking fountain comprising an endless trough for the reception of water, a partition in the trough, said trough having a water inlet therein adjacent one side of the partition and further having a drain opening therein adjacent the other side of said partition, said trough including spaced pairs of inturned covering flanges overlying the trough for providing spaced poultry crossing areas and open drinking areas between said crossing areas, the flanges comprising the pairs of flanges being spaced from each other for defining slots therebetween communicating with the drinking areas for the passage of a cleaning implement, and upstanding guards extending between the pairs of flanges for preventing the poultry from traversing the drinking areas.

2. A poultry drinking fountain in accordance with claim 1, said trough being annular and of substantially semicircular cross section.

3. The combination of claim 1, together with means for supporting and leveling the trough.

4. The combination of claim 3, said means comprising legs secured beneath the trough and depending therefrom at spaced points, and sleeves threadedly mounted on the lower end portions of said legs for resting on a supporting surface beneath the trough.

5. A poultry drinking fountain in accordance with claim 1, said pairs of flanges comprising convergent guides for directing a cleaning implement into the slots.

6. The combination of claim 1, together with means for mounting the trough on a brooder stove in spaced relation thereto for warming water in said trough therefrom.

7. The combination of claim 6, said means comprising arms for mounting radially on a brooder stove, and chains at spaced points on the trough connected to one end portion of said arms.

References Cited in the file of this patent

UNITED STATES PATENTS

| | | |
|---|---|---|
| 1,816,684 | Liechty | July 28, 1931 |
| 2,384,900 | Duncan | Sept. 18, 1945 |
| 2,492,806 | Levine | Dec. 27, 1949 |
| 2,706,966 | Cline | Apr. 26, 1955 |